US012108347B2

(12) United States Patent
Wigren et al.

(10) Patent No.: US 12,108,347 B2
(45) Date of Patent: Oct. 1, 2024

(54) METHODS AND APPARATUSES FOR COORDINATED CONTROL OF AVERAGE EIRP

(71) Applicant: Telefonaktiebolaget LM Ericsson (publ), Stockholm (SE)

(72) Inventors: Torbjörn Wigren, Uppsala (SE); Christer Törnevik, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 382 days.

(21) Appl. No.: 17/641,541

(22) PCT Filed: Sep. 10, 2019

(86) PCT No.: PCT/SE2019/050849
§ 371 (c)(1),
(2) Date: Mar. 9, 2022

(87) PCT Pub. No.: WO2021/049982
PCT Pub. Date: Mar. 18, 2021

(65) Prior Publication Data
US 2022/0338134 A1    Oct. 20, 2022

(51) Int. Cl.
*H04B 7/00* (2006.01)
*H04B 17/10* (2015.01)
(Continued)

(52) U.S. Cl.
CPC ........ *H04W 52/343* (2013.01); *H04B 17/102* (2015.01); *H04W 52/367* (2013.01); *H04W 52/42* (2013.01)

(58) Field of Classification Search
CPC ............... H04W 52/343; H04W 52/12; H04W 52/367; H04W 52/42; H04W 52/225; H04B 17/102
See application file for complete search history.

(56) References Cited

U.S. PATENT DOCUMENTS 6,975,605 B2 * 12/2005 Hirahara ............... H04W 36/18
                                                          455/442
7,747,271 B2 *  6/2010 Walton ................. H04W 52/42
                                                          455/39
(Continued)

FOREIGN PATENT DOCUMENTS

WO    WO 2018/027677 A1    2/2018
WO    WO 2018/056876 A1    3/2018

OTHER PUBLICATIONS

International Search Report and Written Opinion of the International Searching Authority, PCT/SE2019/050849, mailed May 12, 2020, 9 pages.

*Primary Examiner* — Tuan Pham
(74) *Attorney, Agent, or Firm* — Sage Patent Group

(57) ABSTRACT

There is provided mechanisms for average EIRP control of at least two radio signal paths. A method is performed by a coordinating controller of a site that includes the at least two radio signal paths. The method includes obtaining, from a respective inner controller of each of the at least two radio signal paths, long-term time averaged traffic related information for each of the at least two radio signal paths. The method includes determining control information for each of the at least two radio signal paths based on the long-term time averaged traffic related information, antenna gain information for each of the at least two radio signal paths, and a condition on total average EIRP for the site, and performing individual average EIRP control of each of the at least two radio signal paths by providing the control information to each respective inner controller.

19 Claims, 12 Drawing Sheets

(51) Int. Cl.
*H04W 52/34* (2009.01)
*H04W 52/36* (2009.01)
*H04W 52/42* (2009.01)

(56) References Cited

U.S. PATENT DOCUMENTS 11,956,054 B2 * 4/2024 Zhou .................... H04B 7/0693
2007/0046539 A1   3/2007 Mani et al.

* cited by examiner

METHODS AND APPARATUSES FOR COORDINATED CONTROL OF AVERAGE EIRP

CROSS REFERENCE TO RELATED APPLICATIONS

This application is a 35 U.S.C. § 371 national stage application of PCT International Application No. PCT/SE2019/050849 filed on Sep. 10, 2019, the disclosure and content of which is incorporated by reference herein in its entirety.

TECHNICAL FIELD

Embodiments presented herein relate to methods, a coordinating controller, an inner controller, computer programs, and a computer program product for average EIRP control of at least one radio signal path.

BACKGROUND

When any radio equipment is to be deployed, regulatory radio frequency (RF) electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins.

Some newly developed base stations and other radio equipment are equipped with so-called advanced antenna systems (AAS). These antenna systems increase the capacity and/or coverage compared to traditionally used antenna systems by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the equivalent power radiated from an antenna with unity antenna gain in all directions, is increased as compared to the situation without AAS systems.

The RF EMF exposure limitations are typically expressed in terms of the power density (in units of $W/m^2$) which in the far field is proportional to the EIRP. Consequently, the EIRP can be used to determine the power density in the far field.

The ICNIRP and other RF EMF exposure limitations are usually expressed in terms of average power densities over a specified averaging time interval T. This means that the momentary power density can be higher during a shorter time than T, however the time-averaged power density over any time period T must be below the specified limit. To maintain a certain RF EMF compliance boundary or exclusion zone, that is smaller than what is obtained using the maximum EIRP of the AAS equipped radio, the time-averaged total transmit power needs to be controlled to be less than an average power threshold that is computed based on the RF exposure limitations and the selected exclusion zone. In cases where more than one radio power source share the same AAS or where several AASs are co-sited and aligned directionally, the threshold may have to be computed based on the combined EIRP of the site.

Hence, there may be a need for efficient co-ordinated control of the average EIRP for multiple base stations and other radio equipment.

SUMMARY

An object of embodiments herein is to provide efficient control of radio power sources of base stations and other radio equipment, so that RF EMF exclusion zones are maintained by the controlled time-averaged powers of the base stations and radio equipment.

This objective is generally solved by mechanisms performed by a coordinating controller for average EIRP control of at least two radio signal paths.

According to a first aspect there is presented a method for average EIRP control of at least two radio signal paths. The method is performed by a coordinating controller of a site. The site comprises the at least two radio signal paths. The method comprises obtaining, from a respective inner controller of each of the at least two radio signal paths, long-term time averaged traffic related information for each of the at least two radio signal paths. The method comprises determining control information for each of the at least two radio signal paths based on the long-term time averaged traffic related information, antenna gain information for each of the at least two radio signal paths, and a condition on total average EIRP for the site. The method comprises performing individual average EIRP control of each of the at least two radio signal paths by providing, to each respective inner controller, the control information.

According to a second aspect there is presented a coordinating controller for average EIRP control of at least two radio signal paths. The coordinating controller comprises processing circuitry. The processing circuitry is configured to cause the coordinating controller to obtain, from a respective inner controller of each of the at least two radio signal paths, long-term time averaged traffic related information for each of the at least two radio signal paths. The processing circuitry is configured to cause the coordinating controller to determine control information for each of the at least two radio signal paths based on the long-term time averaged traffic related information, antenna gain information for each of the at least two radio signal paths, and a condition on total average EIRP for the site. The processing circuitry is configured to cause the coordinating controller to perform individual average EIRP control of each of the at least two radio signal paths by providing, to each respective inner controller, the control information.

According to a third aspect there is presented a coordinating controller for average EIRP control of at least two radio signal paths. The coordinating controller comprises an obtain module configured to obtain, from a respective inner controller of each of the at least two radio signal paths, long-term time averaged traffic related information for each of the at least two radio signal paths. The coordinating controller comprises a determine module configured to determine control information for each of the at least two radio signal paths based on the long-term time averaged traffic related information, antenna gain information for each of the at least two radio signal paths, and a condition on total average EIRP for the site. The coordinating controller comprises a control module configured to perform individual average EIRP control of each of the at least two radio signal paths by providing, to each respective inner controller, the control information.

According to a fourth aspect there is presented a computer program for average EIRP control of at least two radio signal paths. The computer program comprises computer program code which, when run on processing circuitry of a coordinating controller, causes the coordinating controller to perform a method according to the first aspect.

The objective is generally further solved by mechanisms performed by an inner controller for average EIRP control of a radio signal path.

According to a fifth aspect there is presented a method for average EIRP control of a radio signal path. The method is performed by an inner controller of the radio signal path. The method comprises providing long-term time averaged traffic related information for the radio signal path to a coordinating controller of a site. The site comprises the radio signal path and at least one further radio signal path. The method comprises obtaining control information from the coordinating controller. The control information is determined based on the long-term time averaged traffic related information for the radio signal paths, antenna gain information for each of the radio signal paths, and a condition on total average EIRP for the site. The method comprises performing average EIRP control of the radio signal path according to the control information whereby the average EIRP of the radio signal path is controlled based on an inner control loop run by the inner controller.

According to a sixth aspect there is presented an inner controller for average EIRP control of a radio signal path. The inner controller comprises processing circuitry. The processing circuitry is configured to cause the inner controller to provide long-term time averaged traffic related information for the radio signal path to a coordinating controller of a site. The site comprises the radio signal path and at least one further radio signal path. The processing circuitry is configured to cause the inner controller to obtain control information from the coordinating controller. The control information is determined based on the long-term time averaged traffic related information for the radio signal paths, antenna gain information for each of the radio signal paths, and a condition on total average EIRP for the site. The processing circuitry is configured to cause the inner controller to perform average EIRP control of the radio signal path according to the control information whereby the average EIRP of the radio signal path is controlled based on an inner control loop run by the inner controller.

According to a seventh aspect there is presented an inner controller for average EIRP control of a radio signal path. The inner controller comprises a provide module configured to provide long-term time averaged traffic related information for the radio signal path to a coordinating controller of a site. The site comprises the radio signal path and at least one further radio signal path. The inner controller comprises an obtain module configured to obtain control information from the coordinating controller. The control information is determined based on the long-term time averaged traffic related information for the radio signal paths, antenna gain information for each of the radio signal paths, and a condition on total average EIRP for the site. The inner controller comprises a control module configured to perform average EIRP control of the radio signal path according to the control information whereby the average EIRP of the radio signal path is controlled based on an inner control loop run by the inner controller.

According to an eight aspect there is presented a computer program for average EIRP control of a radio signal path, the computer program comprising computer program code which, when run on processing circuitry of an inner controller, causes the inner controller to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously, these methods, these coordinating controllers, these inner controllers, these computer programs, and this computer program product provide efficient control of radio power sources, as represented by the radio signal paths, of base stations and other radio equipment, so that RF EMF exclusion zones are maintained by the controlled time-averaged powers of the base stations and radio equipment.

Advantageously, these methods, these coordinating controllers, these inner controllers, these computer programs, and this computer program product enable the throughput of the network, and the site in particular, to be increased, whilst guaranteeing that the computed average power threshold to meet RF exposure regulations is maintained.

Advantageously, these methods, these coordinating controllers, these inner controllers, these computer programs, and this computer program product enable increased throughput of different types of sites, such as sites configured for spectrum sharing, dual connectivity, beamforming, and/or two or more RATs, whilst guaranteeing that the computed average power threshold to meet RF exposure regulations is maintained.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
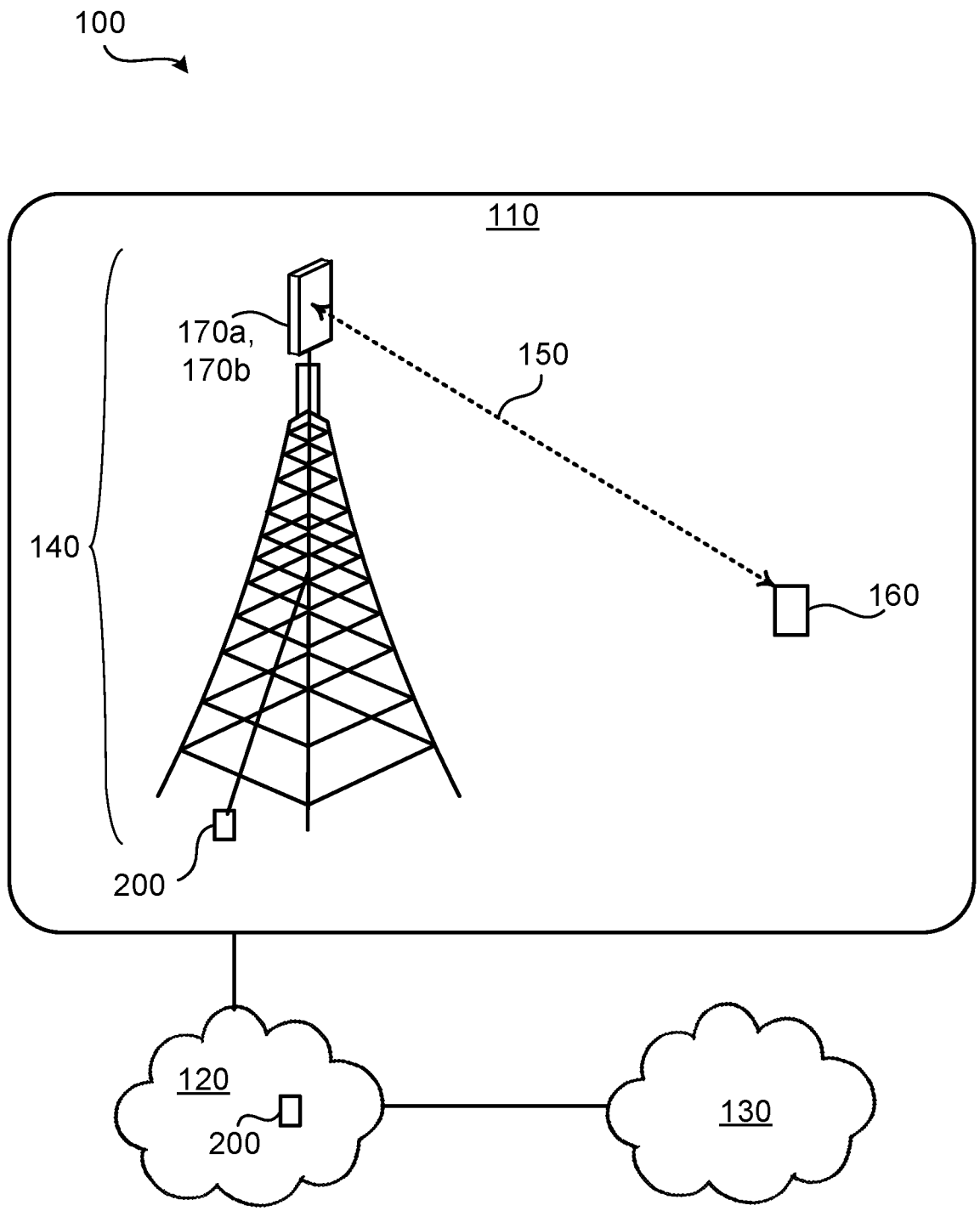
FIG. 1 is a schematic diagram illustrating a communication network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network, or any combination thereof, and support any 3GPP telecommunications standard, where applicable.

A site 140 provides network access to at least one terminal device 160 in a radio access network 110, thus enabling the terminal device 160 to communicate over a wireless link 150. The radio access network 110 is operatively connected to a core network 120. The core network 120 is in turn operatively connected to a service network 130, such as the Internet. The terminal device 160 is thereby enabled to, via the site 140, access services of, and exchange data with, the service network 130.

Examples of sites 140 are radio base stations, radio access network nodes, base transceiver stations, Node Bs (NBs), evolved Node Bs (eNBs), gNBs, access points, access nodes, and backhaul nodes. Examples of terminal devices 160 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The communications network 100 comprises a coordinating controller 200 configured to control how much power is transmitted along radio signal paths 170a, 170b of the site 140 for facilitating the communication to the terminal device 160. The coordinating controller 200 might comprise, be collocated with, integrated with, or be in operational communications with, the site 140. The site 140 might be configured for dual connectivity and/or carrier aggregation.

In some examples the site 140 is equipped with one, or multiple co-sited and bore sight aligned, AASs. Each AAS might then be configured to transmit radio power as provided from a respective at least one of the at least two radio signal paths 170a, 170b (i.e., from one or more respective ones of the radio signal paths 170a, 170b).

There might be different types of radio signals paths 170a, 170b and/or different types of entities that the radio signals paths 170a, 170b represent or are associated with. According to some examples, each radio signal path 170a, 170b is associated with a respective carrier as transmitted by the site 140. According to some examples, each radio signal path 170a, 170b is associated with a respective scheduler of the site 140. According to some examples, each radio signal path 170a, 170b represents a respective radio power source of a single radio access network node of the site 140. According to some examples, the site 140 comprises multiple radio access network nodes and each radio signal path 170a, 170b represents a respective radio access network node of the site 140.

In some aspects the site 140 supports spectrum sharing by means of transmission using at least two different radio access technologies (RATs), such as transmission over the 4G Long Term Evolution (LTE) air interface and the 5G New Radio (NR) air interface. Spectrum sharing allows LTE and NR to share a common time/frequency resource grid. Time/frequency resources in the time/frequency resource grid might be allocated separately for different RATs. According to some examples, at least one of the at least two radio signal paths 170a, 170b is configured for a first RAT, and at least one other of the at least two radio signal paths 170a, 170b is configured for a second RAT different from the first RAT. The herein disclosed embodiments then enable coordinated control of radio signal paths 170a, 170b used for spectrum sharing.

In some aspects the site 140 supports dual connectivity. In general terms, according to dual connectivity, a terminal device 160 might simultaneously receive and transmit to at least two different radio access network nodes, such as a (Master-) MeNB and a (Secondary-) SeNB. In the split bearer architecture option of dual connectivity in the downlink, data is split on the Packet Data Convergence Protocol (PDCP) layer in the MeNB. The radio access network node might route PDCP protocol data units (PDUs) dynamically via MeNB Radio Link Control (RLC) to the terminal device 160 directly, or via a backhaul channel to the SeNB and then via RLC of the SeNB to the terminal device 200.

In some aspects the site 140 supports carrier aggregation. In general terms, according to carrier aggregation a terminal device 160 might simultaneously receive and transmit on at least two different carriers while using a common PDCP, RLC and medium access control (MAC) layer for the carriers but a separate physical layer for each carrier. The site 140 selects the radio resources, modulation, coding and MIMO layers to use on each carrier and schedule MAC PDUs on the carriers based on this selection and on feedback from the terminal device 160. This is in general referred to as scheduling. The carriers are synchronized in time. This implies that a common controller, i.e., the coordinating controller 200, of the site 140 can coordinate and control the use of each carrier per transmission time interval (TTI). Each carrier is also associated with a cell as resource owner.

The AAS might be configured for beamforming. In some examples the range of the AAS is described as the union of a set of discrete beam directions in azimuth and elevation, with respect to the bore sight direction of the AAS. In case of so-called codebook based beamforming, a set of configurable beams with specific directions are provided. These codebooks are very similar between LTE and NR. Therefore, in case the AAS is shared between an LTE node and an NR node, certain sets of beam direction codebook entries might produce overlapping beams. One inner controller 300a, 300b might then be applied per beam direction, to control multiple EIRP contributions in a certain direction in an improved way, as compared to application of multiple single individual controllers based on fixed EIRP budgets, per beam direction. The same principle can be applied also for reciprocity assisted transmission.

In some aspects the site 140 thus supports directional transmission. Then, according to some examples, at least one of the at least two radio signal paths 170a, 170b is configured for a first set of beam direction codebook entries, and at least one other of the at least two radio signal paths 170a, 170b is configured for a second set of beam direction codebook entries, at least partly overlapping with the first set of beam direction codebook entries. The herein disclosed embodiments then enable coordinated control of radio signal paths 170a, 170b of a site 140 that supports overlapping beam sets.

As mentioned above there is a need for efficient control of the average EIRP for base stations and other radio equipment, in particular when co-sited and directionally aligned.

For example, assume a scenario where multiple carriers in a single site 140, possibly using different RATs, are transmitting over the same geographical region, like a cell. For simplicity, antenna array sharing is assumed. Assume further that the site 140 has an inner controller 300a, 300b that implements functionality for single node average EIRP control. The inner control loop of each radio signal path 170a, 170b might be supervised by the inner controller 300a, 300b of each radio signal path 170a, 170b whereas the average EIRP control of the radio signal paths 170a, 170b is collectively controlled by the coordinating controller 200 by providing coordinating control information to the inner controllers 300a, 300b.

Whenever aspects of the inner controllers 300a, 300b are addressed, the concepts of "average power control" and "average EIRP control" may be used interchangeably; one of the two does not exclude that the other one may be equally valid.

The embodiments disclosed herein thus relate to mechanisms for average EIRP control of radio signal paths 170a, 170b. In order to obtain such mechanisms there is provided a coordinating controller 200, a method performed by the coordinating controller 200, a computer program product comprising code, for example in the form of a computer program, that when run on processing circuitry of the coordinating controller 200, causes the coordinating controller 200 to perform the method. In order to obtain such mechanisms there is further provided an inner controller 300a, 300b, a method performed by the inner controller 300a, 300b, and a computer program product comprising code, for example in the form of a computer program, that when run on processing circuitry of the inner controller 300a, 300b, causes the inner controller 300a, 300b to perform the method.

Figure 2:
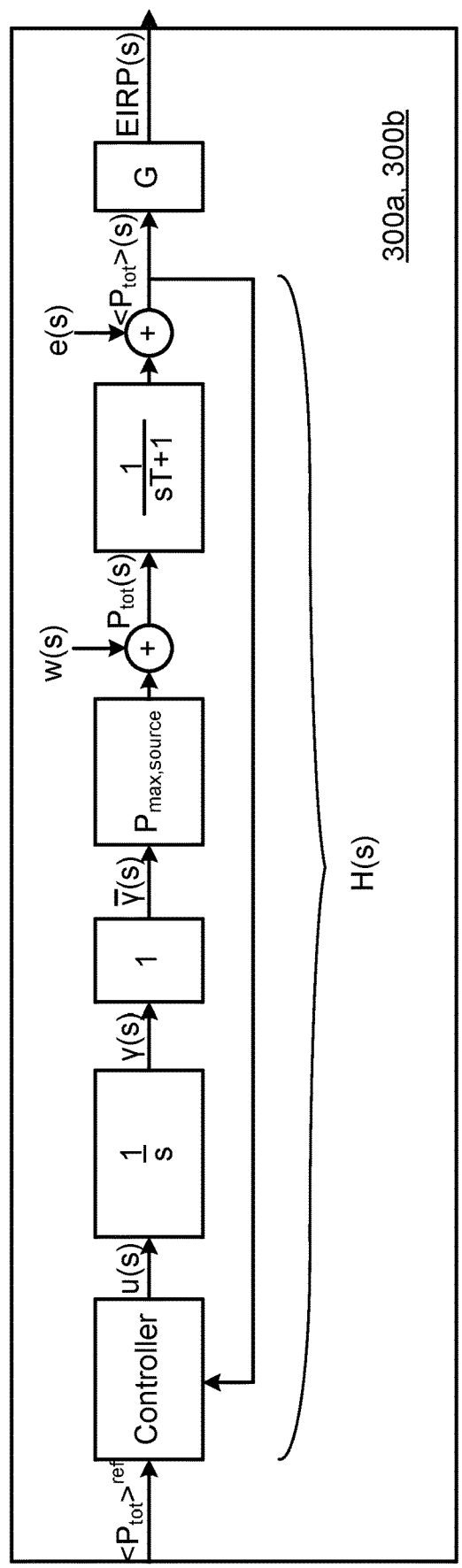
FIGS. 2, 5, 6 are block diagrams of controllers according to embodiments.

FIG. 2 is a block diagram of a controller 300a, 300b where feedback control has been enabled by a feedback control loop, in this disclosure denoted a back-off power control loop. In FIG. 2, $\langle P_{tot} \rangle^{ref}$ denotes the setpoint for the averaged power (typically slightly less than the computed threshold value for the averaged power), 1/s denotes the actuator dynamics with lower and upper limits inactive, $\bar{\gamma}(s)$ denotes the scheduler limitation after lower and upper limitation (inactive in FIG. 2), $P_{max,source}$ denotes the maximal momentary total power of one radio signal path, $w(s)$ denotes a disturbance representing predicted power errors, $1/(sT+1)$ represents an autoregressive simplified model of the averaging, $\langle P_{tot} \rangle (s)$ denotes the averaged total power, $e(s)$ denotes a measurement disturbance, G denotes the antenna gain and EIRP(s) denotes the EIRP. All quantities are in FIG. 2 expressed in the complex Laplace transform domain, which is allowed since the feedback control mechanism design is performed with constraints inactive.

In some aspects the controller block is given by:

$$u(s) = CT(1+T_D s)(\langle P_{tot} \rangle^{ref} - \langle P_{tot} \rangle(s)).$$

Here, $u(s)$ is the control signal. A controller implementing this controller block is of proportional-derivative (PD) type. C denotes the proportional gain, and $T_D$ the differentiation time. To implement the feedback control mechanism, $\langle P_{tot} \rangle^{ref}$, $\langle P_{tot} \rangle(t)$ and $\langle \dot{P}_{tot} \rangle(t)$ are needed. The first two quantities can be obtained by configuration and averaging of measured spectral density's by C, while the second quantity needs to be estimated. This can e.g. be achieved by autoregressive filtering of $\langle P_{tot} \rangle(t)$ with the filter:

$$\langle \dot{P}_{tot} \rangle(s) = \frac{\alpha s}{s+\alpha} \langle P_{tot} \rangle(s),$$

where $\alpha$ is a filter parameter.

In order to further emphasize the back-off control performance it could be advisable to only allow differential control action that reduces the scheduler threshold $\gamma(t)$, meaning that only negative contributions from the second term of the feedback mechanism should be allowed. This means that in the time domain, the following restriction to the derivative $\langle \dot{P}_{tot} \rangle(t)$ might be applied:

$$u(t) = CT(\langle P_{tot} \rangle^{ref} - \langle P_{tot} \rangle(t)) - CTT_D \max(0, \langle \dot{P}_{tot} \rangle(t)).$$

It might occur that the feedback control mechanism is not fast enough to prevent a small overshoot of the threshold value. To prevent this from occurring, a hard back-off might be superimposed over the herein disclosed feedback control mechanism. In some aspects this hard back-off operates by setting the scheduler threshold $\gamma(t)$ to its minimum value $\gamma_{low}$ whenever the following holds:

$$\langle P_{tot} \rangle(t) > \text{margin} \cdot P_{threshold}$$

where margin is a value slightly below 1 and where $P_{threshold}$ is the maximum averaged power threshold determined to meet a regulatory RF EMF exposure requirement. Further aspects of the scheduler threshold $\gamma(t)$ will be disclosed below.

In some aspects there is one control signal $u_i(s)$, $i=1, \ldots, n$, for each of the n radio power sources and hence the index i can be appended to any relevant quantities, such as $\langle P_{tot,i} \rangle^{ref}$, $\langle P_{tot,i} \rangle(t)$ and $\langle P_{tot,i} \rangle(t)$, etc.

It should be noted that in embodiments where the above inner controller 300a, 300b shown by FIG. 2 is modified to be used for certain beam directions, values given as powers may be replaced by values given as EIRPs in certain parts of the control loop.

Figure 3:
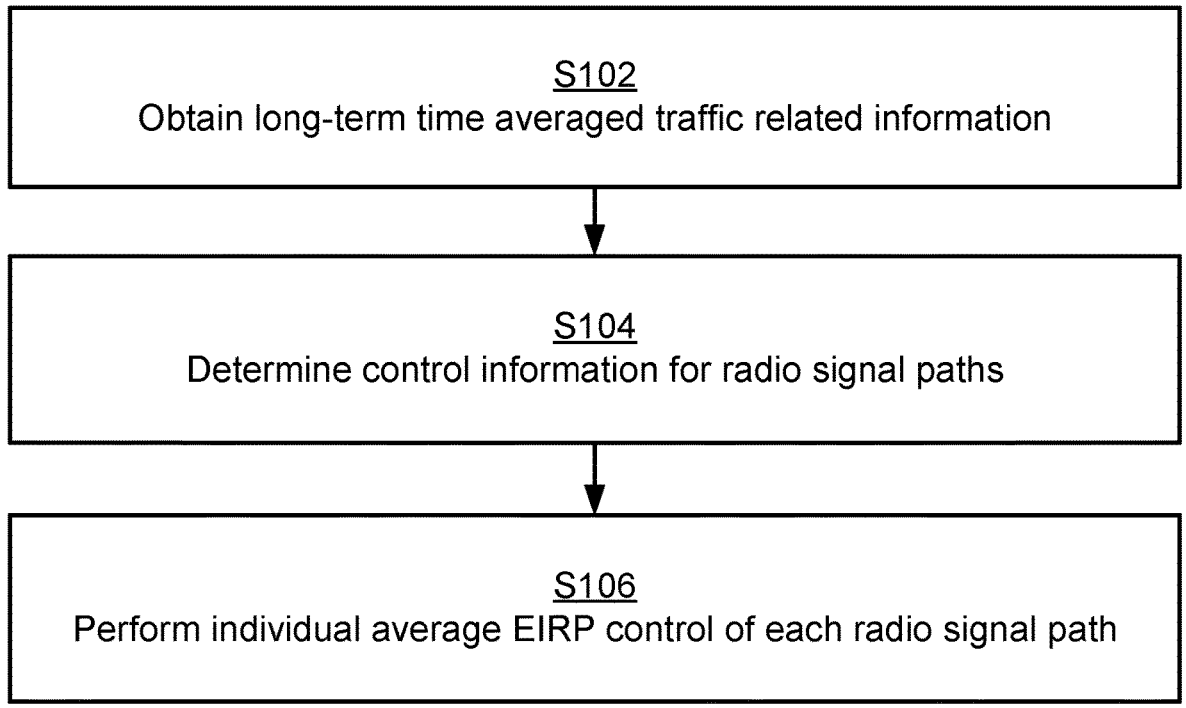
FIGS. 3 and 4 are flowcharts of methods according to embodiments.

Reference is now made to FIG. 3 illustrating a method according to an embodiment for average EIRP control of at least two radio signal paths 170a, 170b as performed by a coordinating controller 200 of a site 140. The site 140 comprises the at least two radio signal paths 170a, 170b.

The control of the at least two radio signal paths 170a, 170b as performed by the coordinating controller 200 is based on information as provided by the inner controllers 300a, 300b. Hence the coordinating controller 200 is configured to perform step S102:

S102: The coordinating controller 200 obtains, from a respective inner controller 300a, 300b of each of the at least two radio signal paths 170a, 170b, long-term time averaged traffic related information for each of the at least two radio signal paths 170a, 170b.

In other words, for a given radio signal path, the coordinating controller 200 obtains long-term time averaged traffic related information of that given radio signal path only from the inner controller of that given radio signal path.

Examples of long-term time averaged traffic related information will be provided below. The control of the at least two radio signal paths 170a, 170b is then determined. Particularly, the coordinating controller 200 is configured to perform step S104:

S104: The coordinating controller 200 determines control information for each of the at least two radio signal paths 170a, 170b based on the long-term time averaged traffic related information, antenna gain information for each of the at least two radio signal paths 170a, 170b, and a condition on total average EIRP for the site 140.

Ways of how the control might be determined will be provided below.

Individual average EIRP control of each of the at least two radio signal paths 170a, 170b is then performed. Particularly, the coordinating controller 200 is configured to perform step S106:

S106: The coordinating controller 200 performs individual average EIRP control of each of the at least two radio signal paths 170a, 170b by providing, to each respective inner controller 300a, 300b, the control information.

Embodiments relating to further details of average EIRP control of at least two radio signal paths 170a, 170b as performed by the coordinating controller 200 will now be disclosed.

There may be different types of long-term time averaged traffic related information. In some embodiments, the long-term time averaged traffic related information relates to number of packets per second or number of bits per second being fed to each of the at least two radio signal paths 170a, 170b.

There may be different types of control information. In some embodiments, the control information is given as time varying reference values $\langle P_{tot} \rangle_i^{ref}(s)$ of transmission power for each of the at least two radio signal paths 170a, 170b.

Aspects of EIRP control objectives to meet RF exposure regulations will now be disclosed.

Assume that there are n co-sited radio signal paths 170a, 170b, possibly using different RATs, that need to be jointly controlled in terms of EIRP. Assume further that the contribution in terms of EIRP of each radio signal path 170a, 170b adds up in a certain direction. These assumptions yield the following expression for the total momentary EIRP in that direction:

$$P_{EIRP,tot}(t) = \sum_{i=1}^{n} P_i(t) G_i(t).$$

Here, $P_i(t)$ is the momentary power for radio signal path i, $G_i(t)$ is the momentary antenna gain associated with radio signal path i, and $P_{EIRP,tot}(t)$ is the total momentary EIRP at time t in the relevant direction. By applying the relevant RF exposure regulation limit(s), typically expressed in terms of power density which in the far field is directly related to EIRP, it is in many cases possible to determine one or several maximum time-averaged EIRP levels that should not be exceeded to comply with the regulatory requirements. The RF exposure regulation compliance in the EIRP domain can be expressed as a time average as follows:

$$\frac{1}{T} \int_{t-T}^{t} \sum_{i=1}^{n} P_i(\tau) G_i(\tau) d\tau = \sum_{i=1}^{n} \frac{1}{T} \int_{t-T}^{t} \sum_{i=1}^{n} P_i(\tau) G_i(\tau) d\tau \leq P_{EIRP,max}.$$

Here the subscript EIRP indicates that the quantity is an EIRP, in this case the maximum total EIRP the radios generate. A further simplification can be achieved in case the momentary antenna gain is reduced to the maximum antenna gain of each contributing radio signal path 170a, 170b, an approximation that amounts to handling a cell wide average EIRP control loop. In such scenarios the above equation reduces to averaging of powers alone as:

$$\sum_{i=1}^{n} G_i \left( \frac{1}{T} \int_{t-T}^{t} P_i(\tau) d\tau \right) = \sum_{i=1}^{n} G_i \langle P_i \rangle(t) \leq P_{EIRP,max}. \quad (1)$$

This equation lends itself to simple linear control of the average EIRP of at least two radio signal paths 170a, 170b and the average EIRP of each radio signal path 170a, 170b.

Aspects of control objectives which might be used for average EIRP control of at least two radio signal paths 170a, 170b will now be disclosed.

In order to benefit from time averaging over the time interval T, a control objective can be introduced for Equation (1), described as:

$$\sum_{i=1}^{n} G_i \langle P_i \rangle(t) \leq \langle P \rangle_{EIRP,regulatory} = \mu P_{EIRPmax}.$$

Here, $\langle P \rangle_{EIRP,regulatory}$ is the maximum total average EIRP determined to meet the regulatory requirement, and $\mu$ is the reduction factor as compared with the total maximum momentary EIRP.

The reference value of the inner controllers 300a, 300b for each average EIRP controlled entity (i.e., for each radio signal path 170a, 170b) can then be used to define the following average EIRP control objective:

$$\sum_{i=1}^{n} G_i \langle P_{tot} \rangle_i^{ref}(t) = \varepsilon \mu P_{EIRP,max}. \quad (2)$$

Here $\varepsilon$ is a factor slightly less than 1 needed to have a control headroom. That is, in some embodiments, the condition on total average EIRP for the site 140 is given in terms of a control headroom factor $\varepsilon$, a safety distance reduction factor $\mu$, and a requirement $P_{EIRP,max}$ on maximum EIRP for the site 140.

In case of co-siting, the co-sited radio signal paths 170a, 170b may be quite differently loaded, making average power back-off control mostly active for one radio signal path 170a, 170b and mostly inactive for another radio signal path 170a, 170b. An efficient use of resources could then be achieved if the average power loads caused by the radio signal paths 170a, 170b would be more equalized. Such an equalization objective might be defined on a more long-term basis than the time constant T used for the inner controllers 300a, 300b.

According to an embodiment, the long-term time averaged traffic related information therefore relates to long-term time averaged output power related information for each of the at least two radio signal paths 170a, 170b. The long-term time averaged output power related information is by the coordinated controller 200 obtained from the respective inner controller 300a, 300b of each of the at least two radio signal paths 170a, 170b.

Further, in some embodiments, determining the control information in S104 comprises equalizing long-term time averaged output powers, as given by the long-term time averaged output power related information, among the at least two radio signal paths 170a, 170b according to an output power equalization control objective.

The following notation is introduced for the long-term average of a signal s(t):

$$\langle\langle s \rangle\rangle(t) = \int_{t-\langle T \rangle}^{t} s(\tau)d\tau.$$

Here, $\langle T \rangle$ is the long-term averaging time. That is, $\langle T \rangle > T$. Thus, in some embodiments, the long-term time averaged traffic related information is based on traffic related information averaged over a window length $\langle T \rangle$, and the long-term time averaged traffic related information is valid for longer time interval than the window length stipulated by RF exposure regulations. In particular, in some embodiments, the control information is determined for a shorter time interval than for which the long-term time averaged traffic related information is valid.

One way to achieve the equalized performance over time is to introduce the following additional n−1 control objectives, weighted by the constants $\beta_i$:

$$\frac{\langle P_{tot} \rangle_1^{ref}(t)}{\langle\langle G_1 P_1 \rangle\rangle(t)} = \beta_i \frac{\langle P_{tot} \rangle_i^{ref}(t)}{G_i \langle\langle P_i \rangle\rangle(t)}, i = 2, \ldots, n.$$

Another way is to measure the average time that the inner controller 300a, 300b of each radio signal path 170a, 170b is active. Particularly, according to an embodiment, the long-term time averaged traffic related information relates to long-term time averaged inner controller activity related information for each of the at least two radio signal paths 170a, 170b. The long-term time averaged inner controller activity related information is by the coordinating controller 200 obtained from the respective inner controller 300a, 300b of each of the at least two radio signal paths 170a, 170b. In further detail, introduce the signal $x_i(t)$ as follows:

$$x_i(t) = \begin{cases} 1, \text{ active} \\ 0, \text{ inactive} \end{cases}, i = 1, \ldots, n$$

The following long-term activity factors can then be defined:

$$f_i(t) = \frac{\langle\langle x_i \rangle\rangle(t)}{\langle\langle 1 \rangle\rangle(t)} = \frac{\langle\langle x_i \rangle\rangle(t)}{\langle T \rangle}, i = 1, \ldots, n.$$

The following additional n−1 supporting control objectives can then be defined:

$$\frac{\langle P_{tot} \rangle_1^{ref}(t)}{f_1(t)} = \beta_i \frac{\langle P_{tot} \rangle_i^{ref}(t)}{f_i(t)} = \beta_i \langle T \rangle \frac{\langle P_{tot} \rangle_i^{ref}(t)}{\langle\langle x_i \rangle\rangle(t)}, i = 2, \ldots, n.$$

Still another way is to measure and average the incoming traffic (such as in terms of packets/second or bits/second) and perform control by adjusting the reference values, i.e. defining the following n−1 supporting control objectives:

$$\frac{\langle P_{tot} \rangle_1^{ref}(t)}{\langle\langle r_1 \rangle\rangle(t)} = \beta_i \frac{\langle P_{tot} \rangle_i^{ref}(t)}{\langle\langle r_i \rangle\rangle(t)}, i = 2, \ldots, n.$$

Here, $r_i(t)$ denotes the incoming traffic along radio signal path i.

Aspects of average EIRP based back-off control will now be disclosed.

In some aspects the unknown time varying average power reference values are directly solved for and recomputed at each time instant. The average EIRP control objective can then be written as:

$$G^T \langle P_{tot} \rangle^{ref}(t) = \varepsilon \mu P_{EIRP,max},$$

$$G^T = (G_1 \ldots G_n)^T, \text{ and}$$

$$(\langle P_{tot} \rangle^{ref}(t))^T = (\langle P_{tot} \rangle^{ref}_1(t) \ldots \langle P_{tot} \rangle^{ref}_n(t))^T.$$

The weighted power equalization control objectives can be written as:

$$\langle P_{tot} \rangle_i^{ref}(t) = \frac{1}{\beta_i} \frac{G_i}{G_1} \frac{\langle\langle P_i \rangle\rangle(t)}{\langle\langle P_1 \rangle\rangle(t)} \langle P_{tot} \rangle_1^{ref}(t) = \rho_i \langle P_{tot} \rangle_1^{ref}(t),$$

$$i = 2, \ldots, n.$$

Insertion into the average EIRP control objective, as defined by Equation (2) results in:

$$G^T \rho(t) \langle P_{tot} \rangle_1^{ref}(t) = \varepsilon \mu P_{EIRP,max},$$

$$\rho^T(t) = (\rho_1(t) \ldots \rho_n(t))^T = \left(1 \frac{1}{\beta_2} \frac{G_2}{G_1} \frac{\langle\langle P_2 \rangle\rangle(t)}{\langle\langle P_1 \rangle\rangle(t)} \ldots \frac{1}{\beta_n} \frac{G_n}{G_1} \frac{\langle\langle P_n \rangle\rangle(t)}{\langle\langle P_1 \rangle\rangle(t)}\right)^T,$$

or $$\langle P_{tot} \rangle_1^{ref}(t) = \frac{\varepsilon \mu P_{EIRP,max}}{G^T \rho(t)},$$

$$\langle P_{tot} \rangle_i^{ref}(t) = \frac{\rho_i(t) \varepsilon \mu P_{EIRP,max}}{G^T \rho(t)} = \frac{1}{\beta_i} \frac{G_i}{G_1} \frac{\langle\langle P_i \rangle\rangle(t)}{\langle\langle P_1 \rangle\rangle(t)} \frac{\varepsilon \mu P_{EIRP,max}}{G^T \rho(t)},$$

$$i = 2, \ldots, n.$$

By measuring $\langle\langle P_i \rangle\rangle(t)$, i=1, ..., n, time varying reference values can be computed so that the reference values meet all selected control objectives. Each of the inner controllers 300a, 300b might thus be provided with a respective time varying reference value computed as above.

A similar derivation based on the average total EIRP control objective and the activity constraints results in time varying power reference values given by:

$$\langle P_{tot} \rangle_1^{ref}(t) = \frac{\varepsilon \mu P_{EIRP,max}}{G^T \sigma(t)},$$

$$\sigma^T(t) = (\sigma_1(t) \ \ldots \ \sigma_n(t))^T = \left(1 \ \frac{1}{\beta_2} \frac{\langle\langle x_2 \rangle\rangle(t)}{\langle\langle x_1 \rangle\rangle(t)} \ \ldots \ \frac{1}{\beta_n} \frac{\langle\langle x_n \rangle\rangle(t)}{\langle\langle x_1 \rangle\rangle(t)}\right)^T,$$

$$\langle P_{tot} \rangle_i^{ref}(t) = \frac{\sigma_i(t) \varepsilon \mu P_{EIRP,max}}{G^T \sigma(t)} = \frac{1}{\beta_i} \frac{\langle\langle x_i \rangle\rangle(t)}{\langle\langle x_1 \rangle\rangle(t)} \frac{\varepsilon \mu P_{EIRP,max}}{G^T \sigma(t)},$$

$$i = 2, \ldots, n.$$

By measuring $\langle\langle x_i \rangle\rangle(t)$, $i=1, \ldots, n$, time varying power reference values can be computed so that the reference values meet all selected control objectives. That is, according to an embodiment, determining the control information in S104 comprises equalizing long-term time averaged inner controller activity rates among the at least two radio signal paths 170a, 170b according to an co-ordinating controller activity equalization control objective and based on the long-term time averaged inner controller activity related information for each of the at least two radio signal paths 170a, 170b. In some embodiments, the long-term time averaged inner controller activity related information is given as a time fraction value representing how long the inner controller 300a, 300b of each of the at least two radio signal paths 170a, 170b is active within a given time frame.

Each of the inner controllers 300a, 300b might thus be provided with a respective time varying reference value computed as above.

A parallel computation based on incoming traffic results in the following expressions for the reference values:

$$\vartheta^T(t) = (\vartheta_1(t) \ \ldots \ \vartheta_n(t))^T = \left(1 \ \frac{1}{\beta_2} \frac{\langle\langle r_2 \rangle\rangle(t)}{\langle\langle r_1 \rangle\rangle(t)} \ \ldots \ \frac{1}{\beta_n} \frac{\langle\langle r_n \rangle\rangle(t)}{\langle\langle r_1 \rangle\rangle(t)}\right)^T,$$

$$\langle P_{tot} \rangle_1^{ref}(t) = \frac{\varepsilon \mu P_{EIRP,max}}{G^T \vartheta(t)},$$

$$\langle P_{tot} \rangle_i^{ref}(t) = \frac{\vartheta_i(t) \varepsilon \mu P_{EIRP,max}}{G^T \vartheta(t)} = \frac{1}{\beta_i} \frac{\langle\langle r_i \rangle\rangle(t)}{\langle\langle r_1 \rangle\rangle(t)} \frac{\varepsilon \mu P_{EIRP,max}}{G^T \vartheta(t)},$$

$$i = 2, \ldots, n.$$

That is, according to an embodiment, determining the control information in S104 comprises equalizing long-term time averaged traffic related information among the at least two radio signal paths 170a, 170b according to an incoming traffic equalization control objective. Such a coordinating controller 200 is simple and easy to use, in particular when activity factors are used and in cases where power values are predicted by baseband computations.

When reference values for the inner controllers 300a, 300b and other thresholds are released to improve the overall performance in co-siting scenarios, the applied linear control does not necessarily guarantee that the released variables stay within a suitable range. In some aspects it is therefore required that the following holds:

$$\langle P_{min} \rangle_i \leq \langle P \rangle_i^{ref}(t) \leq \langle P_{max} \rangle_i.$$

Note also that the EIRP thresholds for the individual radio signal paths 170a, 170b that sum up to the total EIRP limit are slaved to the corresponding reference values, since the coordinating controller 200 naturally affects the reference values of the inner loops (as run by each of the inner controllers 300a, 300b).

As disclosed above, in some aspects the control is of proportional-derivative (PD) type. That is, according to an embodiment the inner control loop is of PD type. As also disclosed above, in some aspects the control is of derivative (D) type. That is, according to an embodiment the inner control loop is of D type. Thus, in some aspects only differential control is allowed.

In some aspects the average transmission power applied to each of the radio signal paths 170a, 170b is limited. Particularly, in some aspects the average transmission power applied to each of the radio signal paths 170a, 170b is limited by the scheduler threshold γ(t). In more detail, in order to get a smooth behavior of the limiting scheduler threshold to limit the average transmission power, it might be rate controlled. That means that the control signal commands adjustments to the limiter, making it increase or decrease, typically in small steps. The dynamics of the actuator mechanism might therefore be determined to be:

$$\dot{\gamma}(t) = u(t),$$

where $\dot{\gamma}(t)$ is the derivative of the scheduler threshold γ(t) and where u(t) is the control signal above expressed in the time domain. The scheduler threshold just expresses a fractional limitation not to use more than a fraction, as given by γ(t), of the total resources.

In some aspects the scheduler threshold γ(t) is set to its minimum value when the value of average transmission power is larger than a threshold value. In more detail, the maximum value of γ(t) is 1 since it is to express a fraction of the maximum amount of scheduler resources. There might also be a need to limit its lower value in order to avoid that the dynamic feedback control mechanism reduces it to an unphysical value below 0. The following scheduler threshold limitation might therefore be applied:

$$\gamma_{low} \leq \gamma(t) \leq 1.$$

In some aspects a supervision mechanism is employed for enabling and disabling the proposed controlling of average transmission power of each radio signal path 170a, 170b. That is, in some aspects performing the individual average EIRP control is selectively enabled and disabled. Further, the scheduler threshold γ(t) might be set to its maximum value when performing the individual average power control is enabled.

There could be different ways to determine when to enable and disable the control. In some aspects a comparison to threshold values is made in order to determine when to enable and disable the control. In particular, in some aspects, performing the individual average power control is enabled when the value of the average transmission power is larger than a fractional first threshold value $\delta_1$, and performing the individual average power control is disabled when the value of the average transmission power is smaller than a second fractional power threshold value $\delta_2$, where $\delta_2 \leq \delta_1$. In more detail, one scope of the proposed control is to control the averaged transmission power to be below the threshold determined to meet a regulatory requirement. When this is not needed, the proposed control could be disabled, leaving at least one of the radio signal paths 170a, 170b to operate without any scheduler limitation. Therefore, according to an example: 1) Enable the control when $\langle P_{tot} \rangle(t) > \delta_1 P_{max,source}$, and set γ(t)=1, and 2) Disable the control when $\langle P_{tot} \rangle(t) < \delta_2 P_{max,source}$. In some aspects the values fulfil: $\delta_2 P_{max,source} \leq \langle P_{tot} \rangle^{ref} \leq \delta_1 P_{max,source}$, where $P_{max,source}$ denotes the maximum transmission power per radio signal path 170a, 170b.

The total transmission power of an antenna array can be measured in the radio, just before the antenna. In one example this is achieved by couplers that measure the radio signal amplitude at each signal path to an antenna element. These amplitudes can then be combined into a total transmission power of the radio, with the antenna gain removed.

Based on such measurements, the averaged transmission power can be constructed by integration as:

$$\langle P_{tot}\rangle(t) = \frac{1}{T}\int_{t-T}^{t} P_{tot}(\tau)d\tau.$$

Here $P_{tot}(t)$ is the total measured power in the radio at time t and T is the averaging time specified in the regulation.

Another example is to replace the measured transmission power by a predicted transmission power using information available in the scheduler or elsewhere in baseband. Such a quantity could be obtained e.g. by summing up the momentary scheduled transmission power as estimated by the fraction of physical resource blocks (PRBs) used at each time instant, over the time T.

Figure 4:
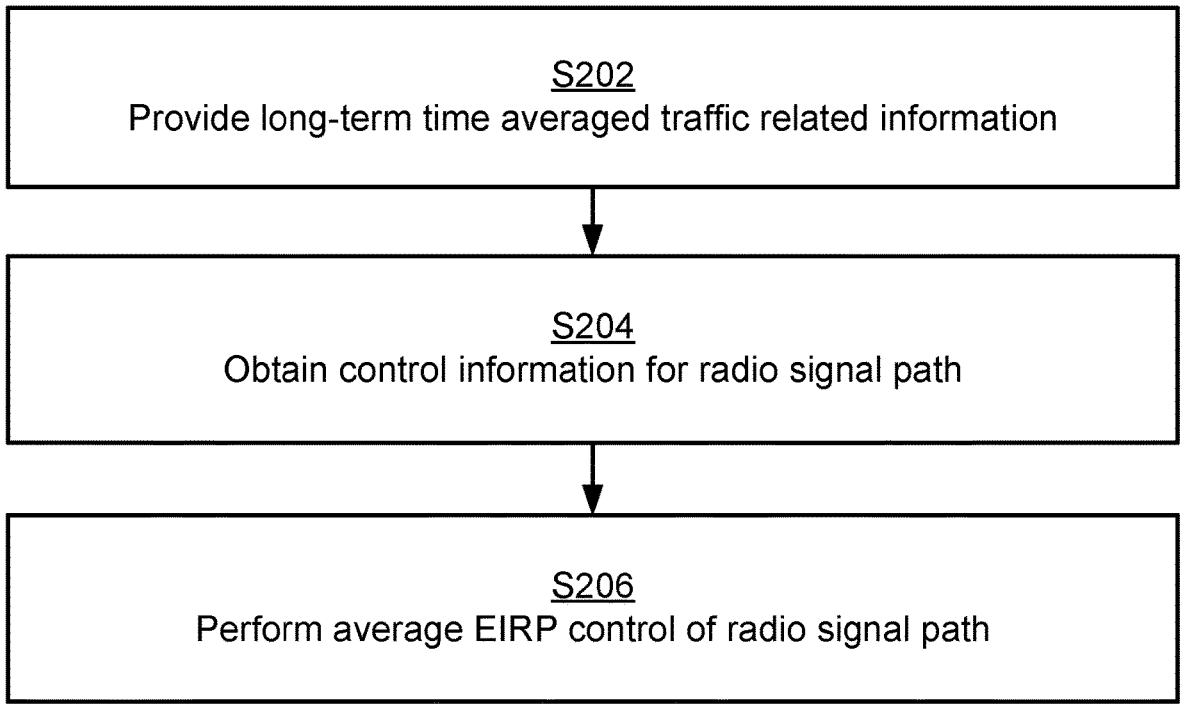

Reference is now made to FIG. 4 illustrating a method according to an embodiment for average EIRP control of a radio signal path 170a, 170b as performed by the inner controller 300a, 300b of the radio signal path 170a, 170b.

As disclosed above, the control of the radio signal path 170a, 170b as performed by the coordinating controller 200 is based on information provided by the inner controllers 300a, 300b. Hence the inner controller 300 is configured to perform step S202:

S202: The inner controller 300a, 300b provides long-term time averaged traffic related information for the radio signal path 170a, 170b to a coordinating controller 200 of a site 140, the site 140 comprising the radio signal path 170a, 170b and at least one further radio signal path 170a, 170b.

As further disclosed above, control of the radio signal path 170a, 170b is by the coordinating controller 300 determined and coordinating control information thereof is provided to the inner controllers 300a, 300b. Hence the inner controller 300a, 300b is configured to perform step S204:

S204: The inner controller 300a, 300b obtains control information from the coordinating controller 200, the control information being determined based on the long-term time averaged traffic related information for the radio signal paths 170a, 170b, antenna gain information for each of the radio signal paths 170a, 170b, and a condition on total average EIRP for the site 140.

Average EIRP control of the radio signal path 170a, 170b is then performed. In particular, the inner controller 300a, 300b is configured to perform step S206:

S206: The inner controller 300a, 300b performs average EIRP control of the radio signal path 170a, 170b according to the control information whereby the average EIRP of the radio signal path 170a, 170b is controlled based on an inner control loop run by the inner controller 300a, 300b.

Embodiments relating to further details of average EIRP control of a radio signal path 170a, 170b as performed by the inner controller 300a, 300b will now be disclosed.

In general terms, the embodiments, aspects, and examples as disclosed above with reference to the coordinating controller 200 applies also to each of the inner controllers 300a, 300b and a repeated disclosure thereof is therefore omitted.

In particular, as disclosed above, in some embodiments, the long-term time averaged traffic related information relates to number of packets per second or number of bits per second being fed to the radio signal path 170a, 170b.

In particular, as disclosed above, in some embodiments, the long-term averaged traffic related information comprises long-term time averaged inner controller activity related information for the radio signal path 170a, 170b.

In particular, as disclosed above, in some embodiments, the long-term averaged traffic related information comprises long-term time averaged output power related information for the radio signal path 170a, 170b.

As disclosed above, there may be different ways to obtain the values of total transmission power $P_{tot}(t)$.

Figure 5:
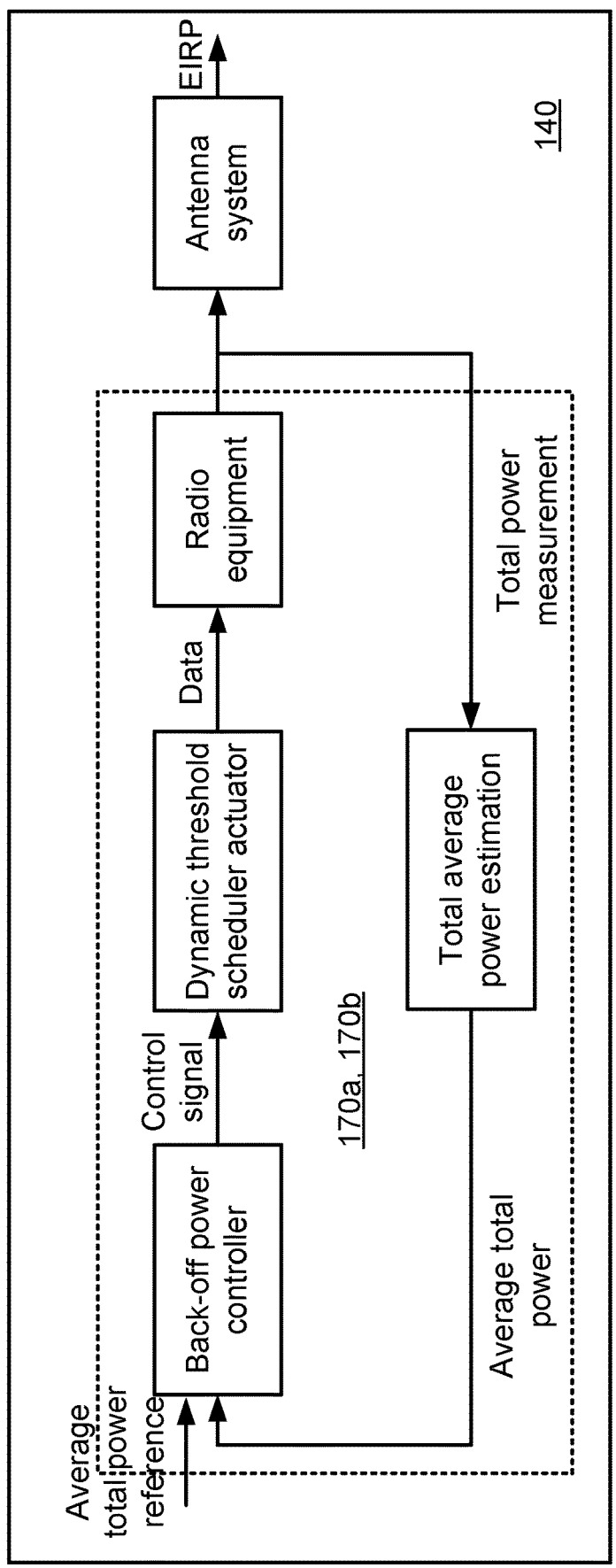

In some aspect the values of total transmission power $P_{tot}(t)$ are measured. FIG. 5 illustrates an architecture of the site 140 where a measured averaged total power feedback from the antenna system of the site 140 is used. According to FIG. 5a back-off power controller, a dynamic threshold scheduler actuator, a total average transmission power estimator, and radio equipment are provided along a radio signal path. The components along the radio signal path are operatively connected to an antenna system (such as an AAS) that may be shared with other radio signal paths. The radio equipment and the antenna system are separated from the remaining components over an interface, such as the C2 interface or similar. Particularly, in some examples the values of total transmission power are measured at input to the antenna system. In this respect, the total output power of an antenna system, over all antenna elements of the antenna system, can be measured in the radio equipment, just before the antenna elements of the antenna system. In some examples this can be done by couplers that measure the radio signal amplitude at each signal path to an antenna element. These amplitudes can then be combined into a total output power of the radio equipment, with the antenna gain removed. This quantity is denoted $P_{tot}(t)$.

Figure 6:
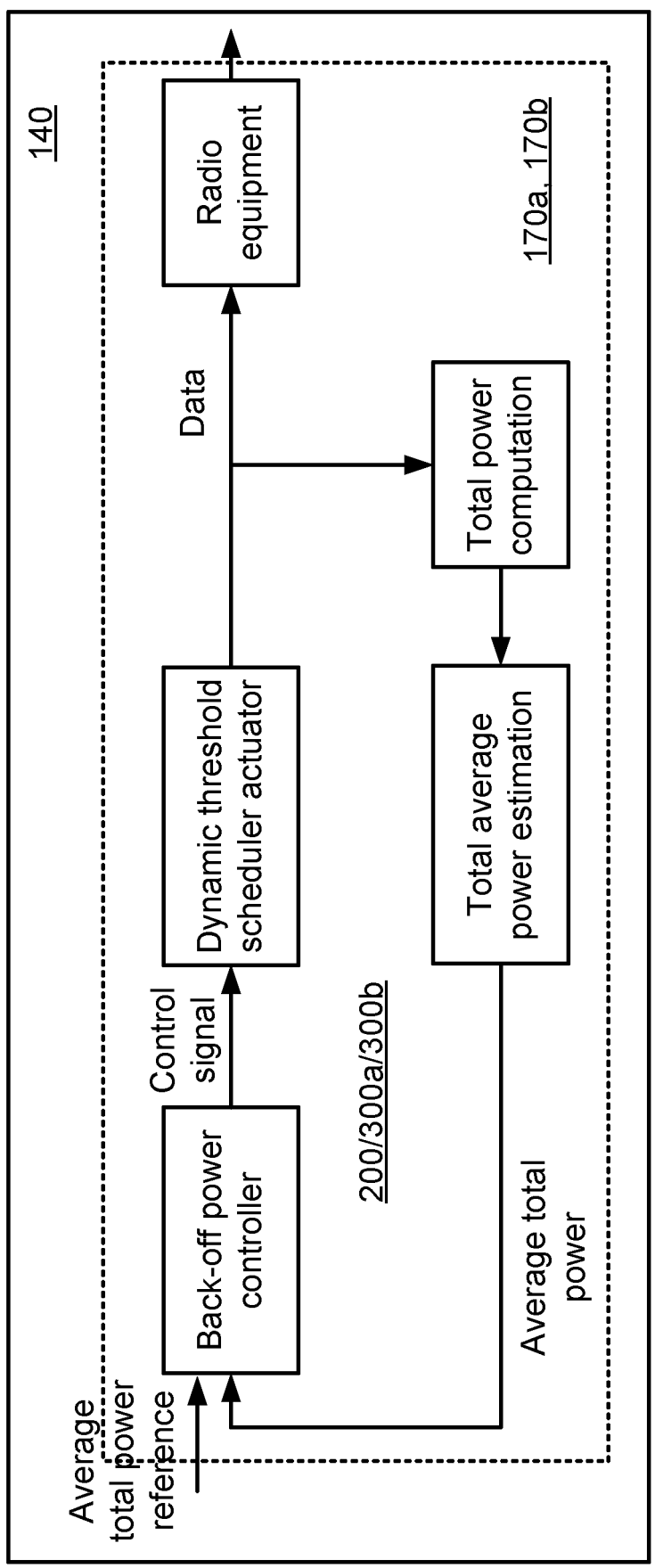

In other aspects the values of total transmission power $P_{tot}(t)$ are predicted. FIG. 6 illustrates an architecture of a site 140 where a predicted averaged total power is used. According to FIG. 6, a back-off power controller, a dynamic threshold scheduler actuator, a total average transmission power estimator, a total transmission power computer, and radio equipment that may be shared with other radio signal paths, are provided along a radio signal path. The radio equipment is separated from the remaining components over an interface, such as the C2 interface or similar. For example, the values of total transmission power $P_{tot}(t)$ can be predicted using information available in the scheduler or elsewhere in baseband. Such a quantity could be obtained, e.g. by summing up the momentary scheduled power as estimated by the fraction of resources used at each time instant t, over the time T.

Figure 7:
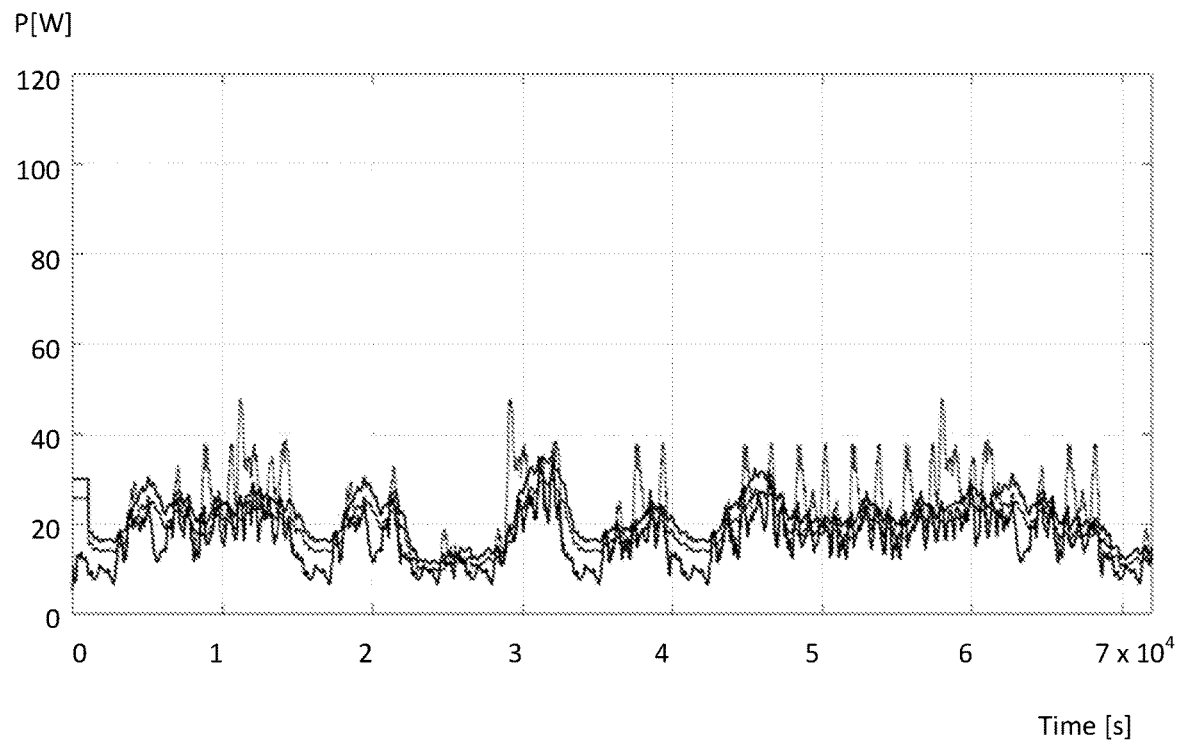
FIGS. 7, 8, and 9 show simulation results according to embodiments.
Figure 8:
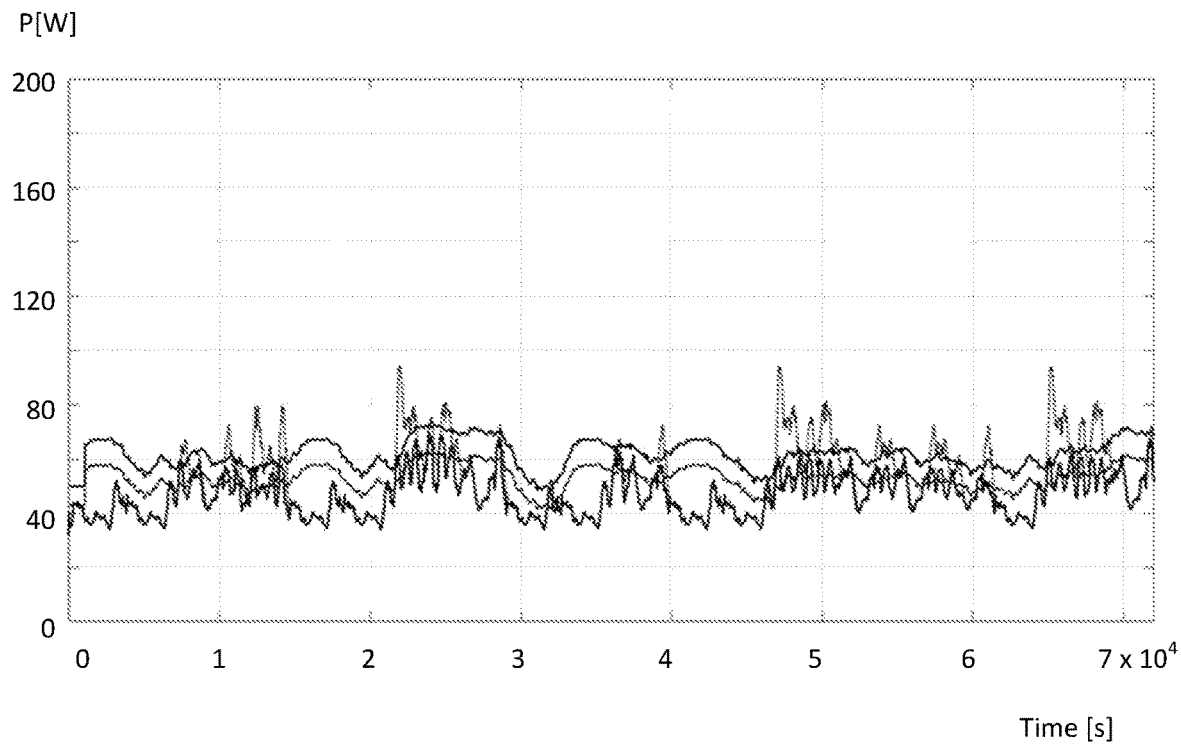
Figure 9:
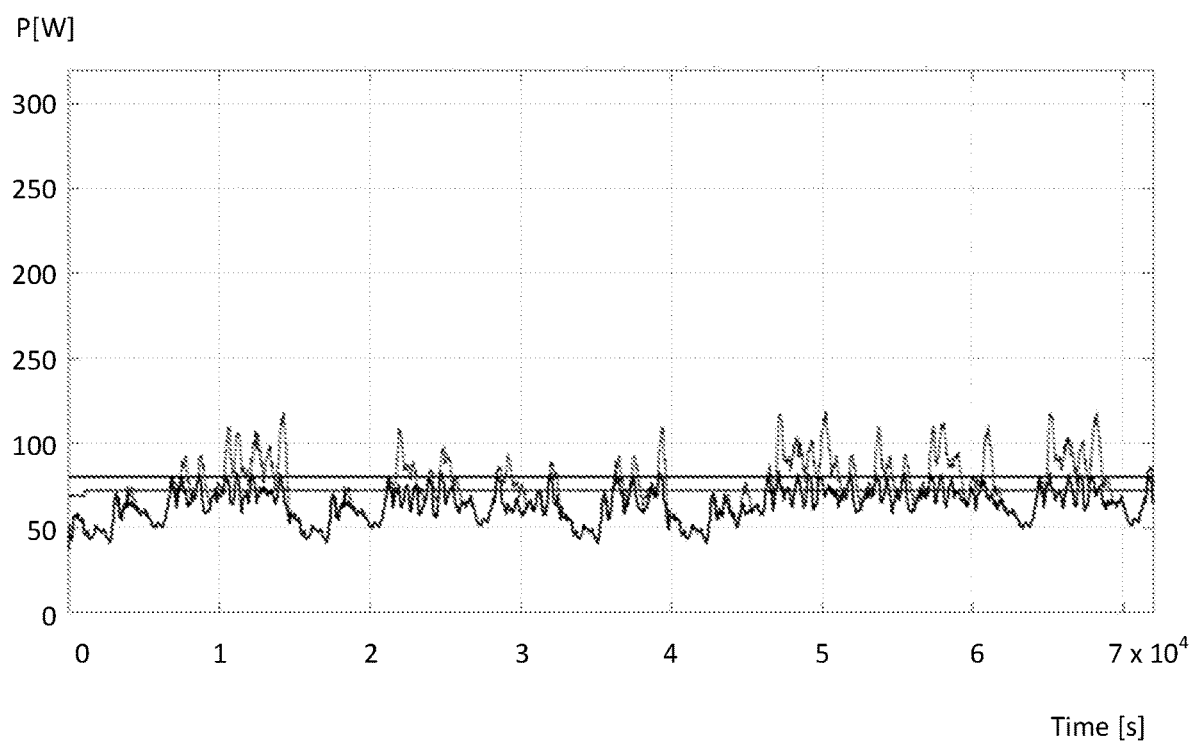

Depending on the implementation, different blocks of the control mechanism (as enclosed by the dotted rectangles in FIGS. 5 and 6) of the radio signal path may be implemented by each inner controller 300a, 300b. This could, for example, depend on whether the power control feedback information is given as $P_{tot,i}(t)$, as $\langle P_{tot,i}\rangle(t)$, or as an activity factor, and whether the coordinating control information is given as $u_i(t)$ or as $\langle P_{tot,i}\rangle^{ref}(t)$. It does not matter whether any of these quantities are given in the Laplace domain or in the time domain. Simulation results of the herein disclosed embodiments will now be presented with reference to FIGS. 7, 8, and 9. The simulation results represent an embodiment where the site 140 comprises one NR node and one LTE node and thus an embodiment where there are two radio signal paths; a first radio signal path representing the NR node and a second radio signal path representing the LTE node. The following values of parameters were used: $P_{max,site,1}$=200 W, NR PDCCH, PDSCH power division, $P_{max,site,2}$=120 W, LTE PDCCH, PDSCH power division, $G_{max,site,1}$=18 dBi, and $G_{max,sit,2}$=18 dBi. The following controller parameter settings were used:

$\mu = 0.25, \varepsilon = 0.90,$ $\langle P \rangle_{EIRP,regulatory} = 0.25 \cdot (200 + 120) \cdot 10^{\frac{18}{10}} = 5048$ W $\beta_2 = 1.00,$ $T = 6$ minutes, and $\langle T \rangle = 18$ minutes.

Dotted lines show uncontrolled average power, solid lines show controlled average power, solid lines also show the computed power threshold, and dashed-dotted lines show the reference value, all quantities shown for the inner controllers. As can be seen by studying the time variation of the powers of FIGS. 7 and 8 it is clear that when one node experiences an increased power level, it "borrows" headroom from the other node, if such headroom is available. The result is a reduced need to limit the scheduled PRBs, which gives a capacity gain. This gain can be substantial, considering the fact that the reference value and threshold limit curves of the first node varies with more than a factor of two.

Figure 10:
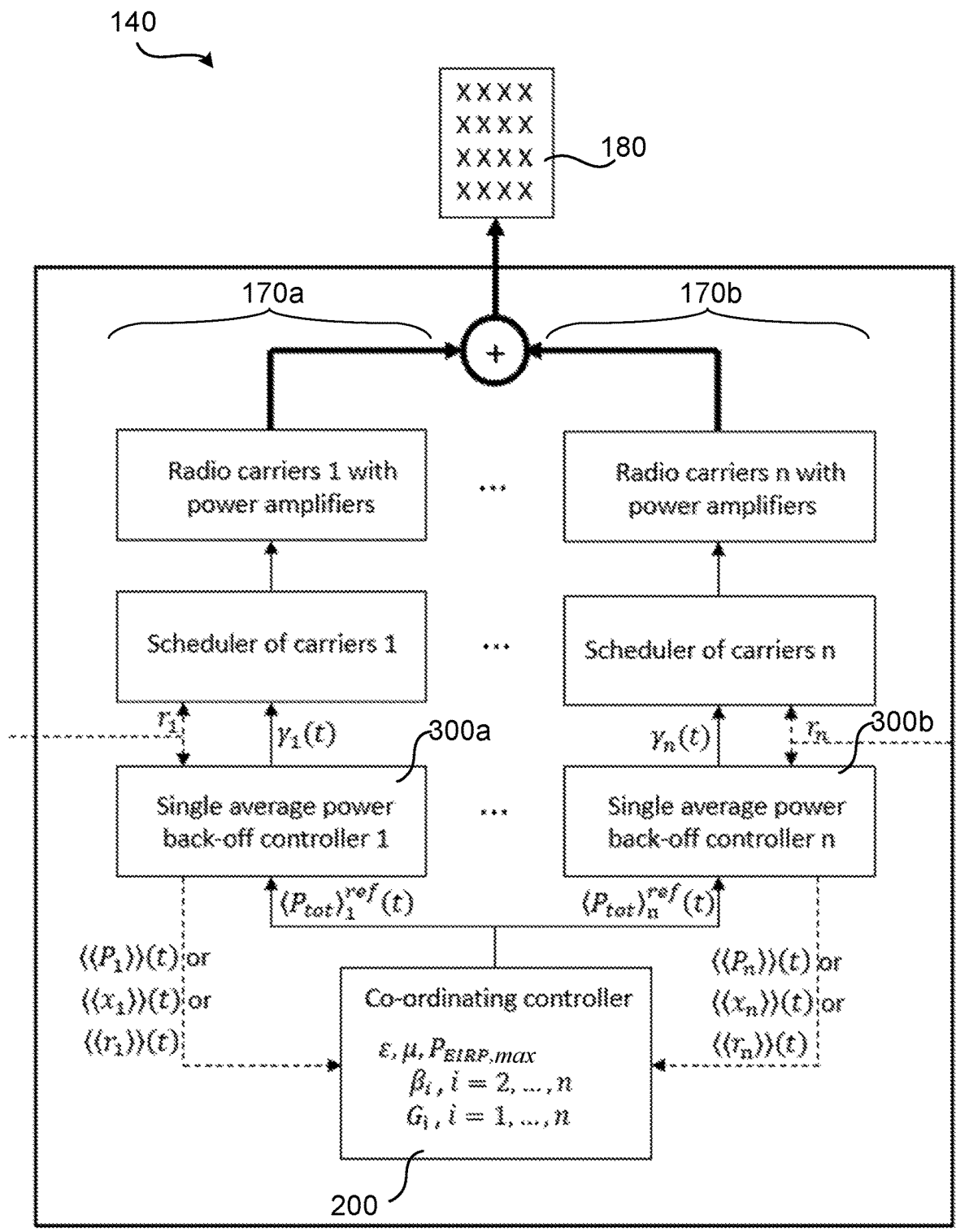
FIGS. 10 and 11 are block diagrams of sites according to embodiments.
Figure 11:
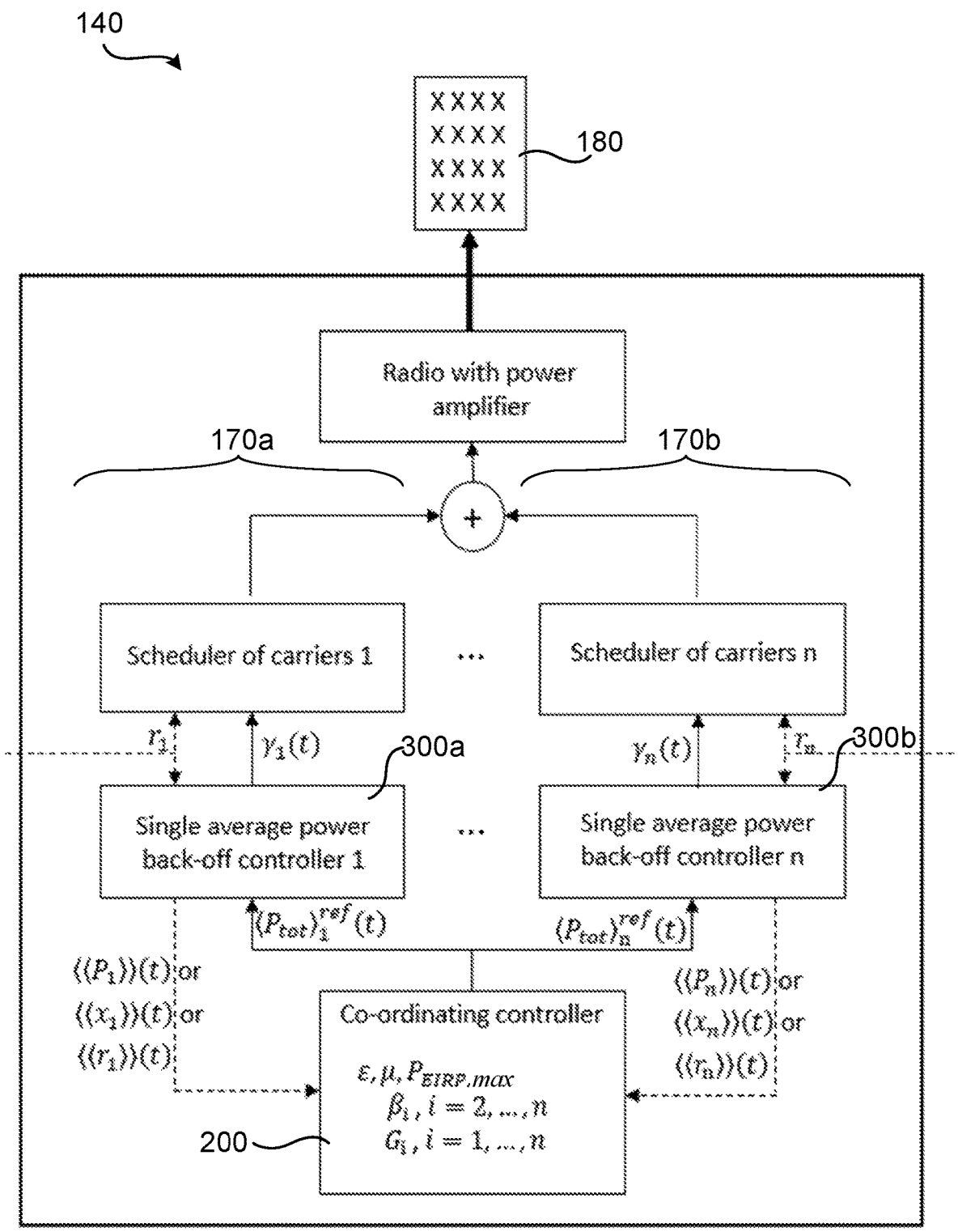

Some implementational examples and architectures, where the herein disclosed embodiments might be applied, will now be disclosed with reference to FIG. 10 and FIG. 11. The examples refer to the use of one single AAS. However, the examples cover at least also the use of closely co-sited and bore-sight aligned AASs.

FIG. 10 schematically illustrates a site 140 having an AAS 180. The AAS receives radio frequency signals that have been combined (summed) in a combiner after power amplification. The site 140 controls n sets of radio carriers, each radio carrier representing a respective radio signal path 170a, 170b, with power amplifiers. Each set of radio carriers is scheduled by a separate scheduler and produces input radio signals to the combiner. A respective inner controller 300a, 300b is provided to control the average power for each set of radio carriers. Each inner controllers 300a, 300b accept a time varying power average reference value, determined by a coordinating controller 200. The coordinating controller 200 might either reside in the site 140, or might be located elsewhere (not shown) and then be operatively connected to the site 140. The inner controllers 300a, 300b receive information of momentary incoming traffic, and they produce long-term average feedback signals described above. The coordinating controller 200 receives the feedback signals and uses these, together with pre-computed and pre-configured parameters, to compute reference values for each of the inner controllers 300a, 300b. The computation might be performed repeatedly with uniform sampling. In response to receiving the reference values, the inner controllers 300a, 300b also adjust internal thresholds.

According to a first alternative of FIG. 10, the site 140 comprises two or more radio access network nodes, all using the same RAT and each producing its own radio signals that are fed to the AAS. Each radio access network node thus represents a respective one of the radio signal paths 170a, 170b.

According to a second alternative of FIG. 10, the site 140 comprises two or more radio access network nodes of two or more different RATs, each radio access network node producing its own radio signals that are fed to the AAS. Each radio access network node thus represents a respective one of the radio signal paths 170a, 170b. For example, a first radio access network node of the site 140, and thus a first 170a of the radio signal paths 170a, 170b, might be configured for transmission over the LTE air interface and a second radio access network node of the site 140, and thus a second 170b of the radio signal paths 170a, 170b, might be configured for transmission over the NR air interface. One LTE node and one NR node might thus be operatively connected to one and the same AAS. The AAS receives radio signals that are combined (summed) after power amplification. Each of the LTE node and the NR node controls a power amplifier and at least one respective scheduler producing input signals for power amplification.

According to a third alternative of FIG. 10, the site comprises a single radio access network node, such as an LTE node or an NR node, having k schedulers, where each scheduler is configured to schedule a set of carriers. Each carrier thus represents a respective one of the radio signal paths 170a, 170b. The contributions from each set of carriers are amplified after which they are combined for transmission in the AAS. The carriers share a set of n overlapping beam directions. Single average EIRP control is applied in each beam direction, for each scheduler. The site 140 is equipped with n individual controllers 300a, 300b, each providing coordinating MIMO average EIRP back-off control for one single beam direction and each inner controller 300a, 300b being controlled by one and the same coordinating controller 200.

According to a fourth alternative of FIG. 10, the site 140 comprises two or more radio access network nodes of the same type, such as two or more LTE nodes or two or more NR nodes, each having a scheduler where each scheduler is configured to schedule a set of carriers. Each carrier thus represents a respective one of the radio signal paths 170a, 170b. The contributions from each radio access network node are amplified after which they are combined for transmission in the AAS. The carriers share a set of n overlapping beam directions. Single average EIRP control is applied in each beam direction, for each scheduler. The site 140 is equipped with n individual controllers 300a, 300b, each providing coordinating MIMO average EIRP back-off control for one single beam direction and each inner controller 300a, 300b being controlled by one and the same coordinating controller 200.

FIG. 11 illustrates a site 140, also with an AAS 180, similar to the one in FIG. 10, with the difference that in the site 140 of FIG. 11 the signals from each set of carriers, where each radio carrier represents a respective radio signal path 170a, 170b, are combined in the baseband domain, after which the combined signal is power amplified and provided to the AAS. Each carrier is controlled by a respective inner controller 300a, 300b, and each inner controller 300a, 300b being controlled by one and the same coordinating controller 200. This alternative is thus similar to FIG. 10 but where the radio access network nodes share RF circuitry where the combining and power amplification is performed. The RF circuitry might be separately provided or provided in one of the radio access network nodes.

According to a first alternative of FIG. 11, the site 140 comprises two or more radio access network nodes, each producing its own radio signal. The signals from each radio access network node, where each radio access network node represents a respective radio signal path 170a, 170b, are combined in the baseband domain, after which the combined signal is power amplified and provided to the AAS. Each radio access network node is controlled by a respective inner controller 300a, 300b, and each inner controller 300a, 300b being controlled by one and the same coordinating controller 200. This alternative is thus similar to the first alternative of FIG. 10 but where the radio access network nodes share RF circuitry where the combining and power amplification is performed. The RF circuitry might be separately provided or provided in one of the radio access network nodes.

According to a second alternative of FIG. 11, the site 140 comprises two or more radio access network nodes of two or more different RATs, each radio access network node producing its own signal. The signals from each radio access network node, where each radio access network node represents a respective radio signal path 170a, 170b, are combined in the baseband domain, after which the combined signal is power amplified and provided to the AAS. A first radio access network node of the site 140, and thus a first 170a of the radio signal paths 170a, 170b, might be configured for transmission over the LTE air interface and a second radio access network node of the site 140, and thus a second 170b of the radio signal paths 170a, 170b, might be configured for transmission over the NR air interface. One LTE node and one NR node might thus be operatively connected to one and the same AAS. In some examples the LTE node and the NR node share one and the same time/frequency resource grid. Alternatively, there is one or more time/frequency resource grids per radio access network node, such as one time/frequency resource grid provided per MU-MIMO layer. The time/frequency resources for each of the radio access network nodes are scheduled by respective schedulers, i.e. one scheduler per radio access network node. Each scheduler is controlled by a respective inner controller 300a, 300b, and each inner controller 300a, 300b being controlled by one and the same coordinating controller 200. The signals from each radio access network node, where the signals are defined by the time/frequency resources allocated by each of the radio access network nodes, are combined in the baseband domain, after which the combined signal is power amplified and provided to the AAS.

According to a third alternative of FIG. 11, the site 140 comprises two or more radio access network nodes of two or more different RATs, each radio access network node producing its own signal. The signals from each radio access network node, where each radio access network node represents a respective radio signal path 170a, 170b, are combined in the baseband domain, after which the combined signal is power amplified and provided to the AAS. Each radio access network node is controlled by a respective inner controller 300a, 300b, and each inner controller 300a, 300b being controlled by one and the same coordinating controller 200. For example, a first radio access network node of the site 140, and thus a first 170a of the radio signal paths 170a, 170b, might be configured for transmission over the LTE air interface and a second radio access network node of the site 140, and thus a second 170b of the radio signal paths 170a, 170b, might be configured for transmission over the NR air interface. This alternative is thus similar to the second alternative of FIG. 10 but where the radio access network nodes share RF circuitry where the combining and power amplification is performed. The RF circuitry might be separately provided or provided in one of the radio access network nodes.

According to a fourth alternative of FIG. 11, the site 140 comprises a single radio access network node, such as an LTE node or an NR node, having k schedulers, where each scheduler is configured to schedule a set of carriers. Each carrier thus represents a respective one of the radio signal paths 170a, 170b. The signals from each radio access network node, where each radio access network node represents a respective radio signal path 170a, 170b, are combined in the baseband domain, after which the combined signal is power amplified and provided to the AAS. Each radio access network node is controlled by a respective inner controller 300a, 300b, and each inner controller 300a, 300b being controlled by one and the same coordinating controller 200. This alternative is thus similar to the third alternative of FIG. 10 but where the radio access network nodes share RF circuitry where the combining and power amplification is performed. The RF circuitry might be separately provided or provided in one of the radio access network nodes.

According to a fifth alternative of FIG. 11, the site 140 comprises two or more radio access network nodes of the same type, such as two or more LTE nodes or two or more NR nodes, each having a scheduler where each scheduler is configured to schedule a set of carriers. Each carrier thus represents a respective one of the radio signal paths 170a, 170b. The signals from each carrier, where each carrier represents a respective radio signal path 170a, 170b, are combined in the baseband domain, after which the combined signal is power amplified and provided to the AAS. The carriers share a set of n overlapping beam directions. Single average EIRP control is applied in each beam direction, for each scheduler. The site 140 is equipped with n individual controllers 300a, 300b, each providing coordinating MIMO average EIRP back-off control for one single beam direction and each inner controller 300a, 300b being controlled by one and the same coordinating controller 200. This alternative is thus similar to the fourth alternative of FIG. 10 but where the radio access network nodes share RF circuitry where the combining and power amplification is performed. The RF circuitry might be separately provided or provided in one of the radio access network nodes.

Figure 12:
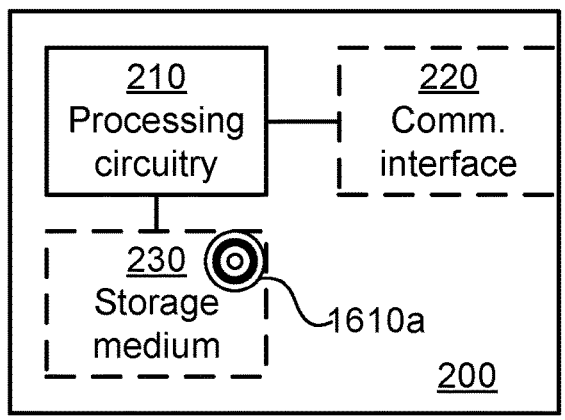
FIG. 12 is a schematic diagram showing functional units of a coordinating controller according to an embodiment.

FIG. 12 schematically illustrates, in terms of a number of functional units, the components of a coordinating controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the coordinating controller 200 to perform a set of operations, or steps, as disclosed above. For example, the storage medium 230 may store the set of operations, and the processing circuitry 210 may be configured to retrieve the set of operations from the storage medium 230 to cause the coordinating controller 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The coordinating controller 200 may further comprise a communications interface 220 for communications with other entities, functions, nodes, and devices, such as the inner controllers 300a, 300b. As such the communications interface 220 may comprise one or more transmitters and receivers, comprising analogue and digital components.

The processing circuitry 210 controls the general operation of the coordinating controller 200 e.g. by sending data and control signals to the communications interface 220 and the storage medium 230, by receiving data and reports from the communications interface 220, and by retrieving data and instructions from the storage medium 230. Other components, as well as the related functionality, of the coordinating controller 200 are omitted in order not to obscure the concepts presented herein.

Figure 13:
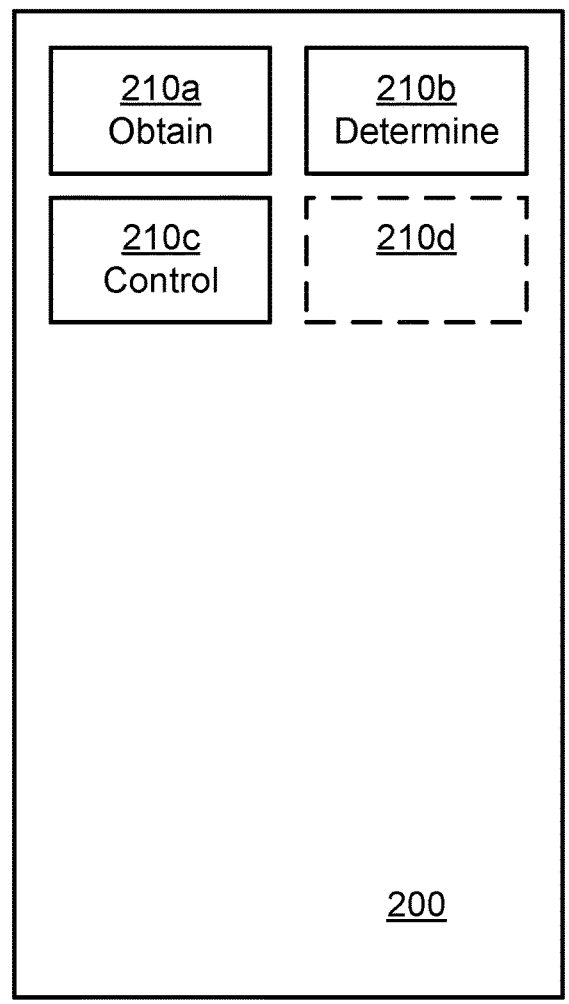
FIG. 13 is a schematic diagram showing functional modules of a coordinating controller according to an embodiment.

FIG. 13 schematically illustrates, in terms of a number of functional modules, the components of a coordinating controller 200 according to an embodiment. The coordinating controller 200 of FIG. 13 comprises a number of functional modules; an obtain module 210a configured to perform step S102, a determine module 210b configured to perform step S104, and a control module 210c configured to perform step S106. The coordinating controller 200 of FIG. 13 may further comprise a number of optional functional modules, as represented by functional module 210d. In general terms, each functional module 210a-210d may be implemented in hardware or in software. Preferably, one or more or all functional modules 210a-210d may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210d and to execute these instructions, thereby performing any steps of the coordinating controller 200 as disclosed herein.

Figure 14:
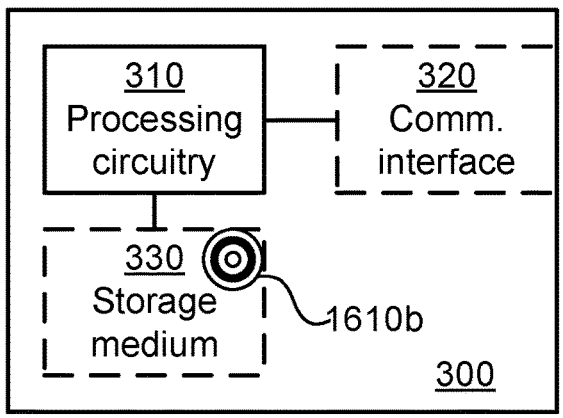
FIG. 14 is a schematic diagram showing functional units of an inner controller according to an embodiment.

FIG. 14 schematically illustrates, in terms of a number of functional units, the components of an inner controller 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the inner controller 300a, 300b to perform a set of operations, or steps, as disclosed above. For example, the storage medium 330 may store the set of operations, and the processing circuitry 310 may be configured to retrieve the set of operations from the storage medium 330 to cause the inner controller 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The inner controller 300a, 300b may further comprise a communications interface 320 for communications with other entities, functions, nodes, and devices, such as the coordinating controller 200. As such the communications interface 320 may comprise one or more transmitters and receivers, comprising analogue and digital components.

The processing circuitry 310 controls the general operation of the inner controller 300a, 300b e.g. by sending data and control signals to the communications interface 320 and the storage medium 330, by receiving data and reports from the communications interface 320, and by retrieving data and instructions from the storage medium 330. Other components, as well as the related functionality, of the inner controller 300a, 300b are omitted in order not to obscure the concepts presented herein.

Figure 15:
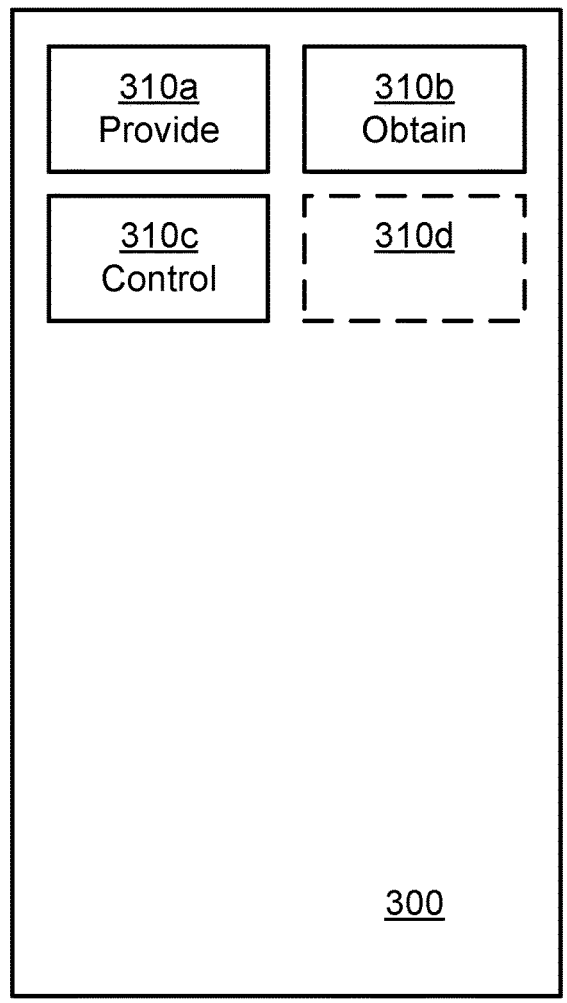
FIG. 15 is a schematic diagram showing functional modules of an inner controller according to an embodiment.

FIG. 15 schematically illustrates, in terms of a number of functional modules, the components of an inner controller 300a, 300b according to an embodiment. The inner controller 300a, 300b of FIG. 15 comprises a number of functional modules; a provide module 310a configured to perform step S202, an obtain module 310b configured to perform step S204, and a control module 310c configured to perform step S206. The inner controller 300a, 300b of FIG. 15 may further comprise a number of optional functional modules, as represented by functional module 310d. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the inner controller 300a, 300b as disclosed herein.

Each of the coordinating controller 200 and inner controller 300a, 300b may be provided as a standalone device or as a part of a respective at least one further device. For example, the coordinating controller 200 and the inner controller 300a, 300b may be provided in a node of the radio access network or in a node of the core network. Alternatively, functionality of the coordinating controller 200 and the inner controller 300a, 300b may be distributed between at least two devices, or nodes. These at least two nodes, or devices, may either be part of the same network part (such as the radio access network or the core network) or may be spread between at least two such network parts. In general terms, the functionality of the coordinating controller 200 may be implemented in one of the sites 140 or even in the core network whereas the functionality of the inner controller 300a, 300b may be implemented in each of the sites 140.

Thus, a first portion of the instructions performed by the coordinating controller 200 and the inner controller 300a, 300b may be executed in a respective first device, and a second portion of the instructions performed by the coordinating controller 200 and the inner controller 300a, 300b may be executed in a respective second device; the herein disclosed embodiments are not limited to any particular number of devices on which the instructions performed by the coordinating controller 200 and the inner controller 300a, 300b may be executed. Hence, the methods according to the herein disclosed embodiments are suitable to be performed by a coordinating controller 200 and/or inner controller 300a, 300b residing in a cloud computational environment. Therefore, although a single processing circuitry 210, 310 is illustrated in FIGS. 11 and 13 the processing circuitry 210, 310 may be distributed among a plurality of devices, or nodes. The same applies to the functional modules 210a-210d 310a-310d of FIGS. 12 and 14 and the computer programs 1620a, 1620b of FIG. 16.

Figure 16:
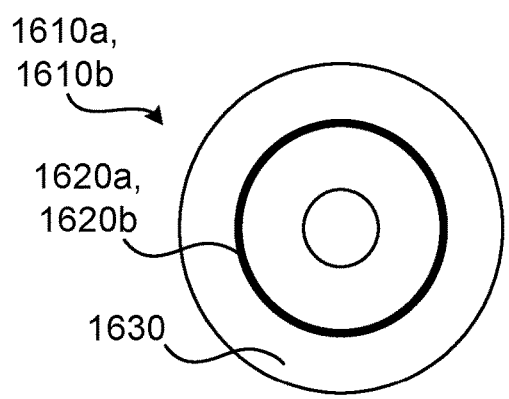
FIG. 16 shows one example of a computer program product comprising computer readable means according to an embodiment.

FIG. 16 shows one example of a computer program product 1610a, 1610b comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the coordinating controller 200 as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the inner controller 300a, 300b as herein disclosed.

In the example of FIG. 16, the computer program product 1610a, 1610b is illustrated as an optical disc, such as a CD (compact disc) or a DVD (digital versatile disc) or a Blu-Ray disc. The computer program product 1610a, 1610b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b is here schematically shown as a track on the depicted optical disk, the computer program 1620a, 1620b can be stored in any way which is suitable for the computer program product 1610a, 1610b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for average Equivalent Isotropic Radiated Power, EIRP, control of at least two radio signal paths, the method being performed by a coordinating controller of a site, the site comprising the at least two radio signal paths, the method comprising:
obtaining, from a respective inner controller of each of the at least two radio signal paths, long-term time averaged traffic related information for each of the at least two radio signal paths;
determining control information for each of the at least two radio signal paths based on the long-term time averaged traffic related information, antenna gain information for each of the at least two radio signal paths, and a condition on total average EIRP for the site; and
performing individual average EIRP control of each of the at least two radio signal paths by providing, to each respective inner controller, the control information.

2. The method according to claim 1, wherein determining the control information comprises equalizing long-term time averaged traffic related information among the at least two radio signal paths according to an incoming traffic equalization control objective.

3. The method according to claim 1, wherein the long-term time averaged traffic related information relates to number of packets per second or number of bits per second being fed to each of the at least two radio signal paths.

4. The method according to claim 1, wherein the long-term time averaged traffic related information relates to long-term time averaged inner controller activity related information for each of the at least two radio signal paths, said long-term time averaged inner controller activity related information being obtained from the respective inner controller of each of the at least two radio signal paths.

5. The method according to claim 4, wherein determining the control information comprises equalizing long-term time averaged inner controller activity rates among the at least two radio signal paths according to an inner controller activity equalization control objective and based on the long-term time averaged inner controller activity related information for each of the at least two radio signal paths.

6. The method according to claim 4, wherein the long-term time averaged inner controller activity related information is given as a time fraction value representing how long the inner controller of each of the at least two radio signal paths is active within a given time frame.

7. The method according to claim 1, wherein the long-term time averaged traffic related information relates to long-term time averaged output power related information for each of the at least two radio signal paths, said long-term time averaged output power related information being obtained from the respective inner controller of each of the at least two radio signal paths.

8. The method according to claim 7, wherein determining the control information comprises equalizing long-term time averaged output powers, as given by the long-term time averaged output power related information, among the at least two radio signal paths according to an output power equalization control objective.

9. The method according to claim 1, wherein the condition on total average EIRP for the site is given in terms of a factor control headroom factor ε, a safety distance reduction factor μ, and a requirement $P_{EIRP,max}$ on momentary EIRP for the site.

10. The method according to claim 1, wherein the control information is given as time varying reference values $\langle P_{tot}\rangle_i^{ref}(s)$ of transmission power for each of the at least two radio signal paths.

11. The method according to claim 1, wherein the long-term time averaged traffic related information is based on traffic related information averaged over a window length $\langle T \rangle$, and wherein the long-term time averaged traffic related information is valid for longer time interval than the window length stipulated by RF exposure regulations.

12. The method according to claim 1, wherein the control information is determined for a shorter time interval than for which the long-term time averaged traffic related information is valid.

13. The method according to claim 1, wherein the site is equipped with one, or multiple co-sited and bore sight aligned, AASs, each AAS being configured to transmit radio power as provided from a respective at least one of the at least two radio signal paths.

14. The method according to claim 1, wherein each radio signal path is associated with a respective carrier as transmitted by the site.

15. The method according to claim 1, wherein each radio signal path is associated with a respective scheduler of the site.

16. A method for average Equivalent Isotropic Radiated Power, EIRP, control of a radio signal path, the method being performed by an inner controller of the radio signal path, the method comprising:
providing long-term time averaged traffic related information for the radio signal path to a coordinating controller of a site, the site comprising the radio signal path and at least one further radio signal path;
obtaining control information from the coordinating controller, the control information being determined based on the long-term time averaged traffic related information for the radio signal paths, antenna gain information for each of the radio signal paths, and a condition on total average EIRP for the site; and performing average EIRP control of the radio signal path according to the control information whereby the average EIRP of the radio signal path is controlled based on an inner control loop run by the inner controller.

17. The method according to claim 16, wherein the long-term time averaged traffic related information relates to number of packets per second or number of bits per second being fed to the radio signal path or comprises long-term time averaged inner controller activity related information for the radio signal path or comprises long-term time averaged output power related information for the radio signal path.

18. A coordinating controller for average Equivalent Isotropic Radiated Power, EIRP, control of at least two radio signal paths, the coordinating controller comprising processing circuitry, the processing circuitry being configured to cause the coordinating controller to:

obtain, from a respective inner controller of each of the at least two radio signal paths, long-term time averaged traffic related information for each of the at least two radio signal paths;

determine control information for each of the at least two radio signal paths based on the long-term time averaged traffic related information, antenna gain information for each of the at least two radio signal paths, and a condition on total average EIRP for the site; and perform individual average EIRP control of each of the at least two radio signal paths by providing, to each respective inner controller, the control information.

19. An inner controller for average Equivalent Isotropic Radiated Power, EIRP, control of a radio signal path, the inner controller comprising processing circuitry, the processing circuitry being configured to cause the inner controller to:

provide long-term time averaged traffic related information for the radio signal path to a coordinating controller of a site, the site comprising the radio signal path and at least one further radio signal path;

obtain control information from the coordinating controller, the control information being determined based on the long-term time averaged traffic related information for the radio signal paths, antenna gain information for each of the radio signal paths, and a condition on total average EIRP for the site; and perform average EIRP control of the radio signal path according to the control information whereby the average EIRP of the radio signal path is controlled based on an inner control loop run by the inner controller.

* * * * *